United States Patent [19]
Holliday

[11] Patent Number: 5,628,244
[45] Date of Patent: May 13, 1997

[54] FOOD ROASTING DEVICE

[76] Inventor: Sydney Holliday, 4217 Fleet, Deer Park, Tex. 77536

[21] Appl. No.: 585,491

[22] Filed: Jan. 16, 1996

[51] Int. Cl.$^6$ ........................................... A47J 43/18
[52] U.S. Cl. ................. 99/421 A; 99/419; 99/441
[58] Field of Search ..................... 99/419, 421 R, 99/421 A, 441; 294/61, 7

[56] References Cited

U.S. PATENT DOCUMENTS

| | | | |
|---|---|---|---|
| D. 244,903 | 7/1977 | Hildebrand | D7/107 |
| D. 344,216 | 2/1994 | Shepherd et al. | D7/683 |
| 2,189,407 | 2/1940 | Tolen | 99/441 |
| 2,479,533 | 8/1949 | Woodbury | 99/419 |
| 2,804,819 | 9/1957 | Whealton | 99/441 |
| 2,974,993 | 3/1961 | Duniven | 294/61 |
| 3,499,538 | 3/1970 | Sherard | 211/13 |
| 3,927,609 | 12/1975 | Scott | 99/419 |
| 4,380,192 | 4/1983 | Doren | 99/441 |
| 4,446,777 | 5/1984 | Grigorenko | 99/419 |
| 4,982,657 | 1/1991 | Ghenic | 99/421 |
| 5,310,381 | 5/1994 | Green | 452/198 |
| 5,355,778 | 10/1994 | Mayfield et al. | 99/441 |

*Primary Examiner*—Reginald Alexander
*Attorney, Agent, or Firm*—Harrison & Egbert

[57] ABSTRACT

A device for roasting a food item including a shaft, a hook member formed at one end of the shaft, and a plurality of spirals formed adjacent to the hook member on the shaft. The spirals have an inner diameter greater than a diameter of the food item. The hook member extends inwardly toward the plurality of spirals. A handle is affixed to an end of the shaft opposite the hook member. The handle includes a strap member affixed thereto. At least one of the spirals adjacent to the hook member is of a lesser diameter than the remainder of the spirals. The shaft, the hook member and the plurality of spirals are formed of a stainless steel wire material. The plurality of spirals has a length less than a length of the food item.

16 Claims, 1 Drawing Sheet

FOOD ROASTING DEVICE

TECHNICAL FIELD

The present invention relates generally to culinary tools. More particularly, the present invention relates to a novel and improved roasting implements intended for use in the roasting of wieners, sausages, hot dogs, frankfurters and marshmellows over an open fire and the like.

BACKGROUND ART

Traditionally, a stick or fork is used by campers for supporting a hot dog, frankfurter, sausage, marshmellow or the like over a campfire during cooking. One end of the stick or fork is normally sharpened and pushed through one or more items, and is then hand-held with the food item positioned immediately over the fire so that the heat of the fire cooks the food.

One shortcoming to the use of sticks of forks for this purpose is that the food item sometimes falls from the stick during cooking, or brushes against the burning logs or coals, thus contaminating the food. Additionally, penetration of the meat causes it to dry during cooking and the cooker must use his or her fingers to manipulate the food item before and after cooking. Additionally, it is difficult to evenly rotate the food item over an open flame so as to cook all around it equally well. A further drawback to a stick or fork is the danger of the user, especially children poking one another in the eye or body with their points.

In the past, various patents have issued relating to the roasting of hot dogs and other food items over an open campfire. In particular, U.S. Design Pat. No. 244,903 teaches a frankfurter roasting stick that has a shaft with a handle at one end and a hook at the opposite end for receiving a hot dog thereon. A loop is formed adjacent to the hook so as to, possibly, receive the hot dog therein. The end of the hot dog is attached to the hook and extends outwardly along the length of the shaft.

U.S. Pat. No. 4,982,657, issued on Jan. 8, 1991, to G. Ghenic teaches a manually-manipulatable device for supporting and rotating a number of hot dogs above the surface of a grill during a cooking operation. The device is equipped with balancer elements that maintain the device in a stabilized condition on the grill surface. An elongated handle is rotatably attached to a housing that mounts a number of rotary hot dog grippers.

U.S. Pat. No. 5,355,778, issued on Oct. 18, 1994, to Mayfield et al. teaches a hand-held, rotatable food roasting apparatus for use in supporting food over a campfire. This device includes a cylindrical receptacle having opposed axial ends, an open interior space, and an opening formed in one of the axial ends through which food may be placed into and removed from the interior space. An elongated handle is attached to the receptacle for allowing the apparatus to be supported and rotated over the source of heat.

U.S. Design Pat. No. 344,216, issued on Feb. 15, 1994, to Shepherd et al. teaches a hot dog/marshmellow roaster having a shaft with three prongs extending outwardly therefrom. Handle elements are provided along the length of the shaft.

U.S. Pat. No. 5,310,381, issued on May 10, 1994 to R. Green teaches a campfire skewer having an elongate member with a first end, a second end, a first portion adjacent to the first end, and a second portion adjacent to the second end. The first end has a means for impaling food. A hand grip is rotatably mounted on the first portion of the elongate member. By holding the hand grip and manipulating the second portion of the elongate member, the elongate member can be made to rotate in a rotisserie-like fashion.

U.S. Pat. No. 3,927,609, issued on Dec. 23, 1975, to R. J. Scott teaches a roasting implement which includes a telescopic rod connected to prongs at one end. A handle is formed at the end of the telescoping rod opposite the prongs. The prongs are normally stored within the rod and telescopically movable thereoutof to expand to a generally V-shaped arrangement.

It is an object of the present invention to provide a device for roasting food items that securely retains the food item at the end of the shaft.

It is another object of the present invention to provide a device that allows the food item to be evenly roasted during the roasting activity.

It is a further object of the present invention to provide a device which forms an attractive grille mark along the outer surface of the food item.

It is still a further object of the present invention to provide a device in which the hook member at the end of the shaft is stowed in a safe position.

These and other objects and advantages of the present invention will become apparent from a reading of the attached specification and appended claims.

SUMMARY OF THE INVENTION

The present invention is a device for roasting a food item comprising a shaft, a hook member formed at one end of the shaft, and a plurality of spirals formed adjacent to the hook member on the shaft. The spirals have an inner diameter greater than a diameter of the food item. The hook member extends inwardly toward the plurality of spirals. A handle is affixed to an end of the shaft opposite the hook member. The has a strap member affixed thereto so as to define a loop extending outwardly of the handle. As used herein, the term "food item" refers to hot dogs, wieners, sausages, frankfurters and marshmellows.

The shaft, the hook member, and the plurality of spirals are made of a unitary construction. In particular, in the preferred embodiment of the present invention, the shaft, the hook member and the plurality of spirals are formed of a stainless steel wire material.

At least one of the spirals is of a lesser diameter than the remainder of the spirals. This spiral is located adjacent to the hook member. In the preferred embodiment of the present invention, the plurality of spirals includes at least eight spirals which are concentrically aligned along a common axis. The hook member has an end point which is centered on this common axis of the spirals. The plurality of spirals have a length less than the length of the food item, where the food item is a weiner.

DETAILED DESCRIPTION OF THE INVENTION

Figure 1:
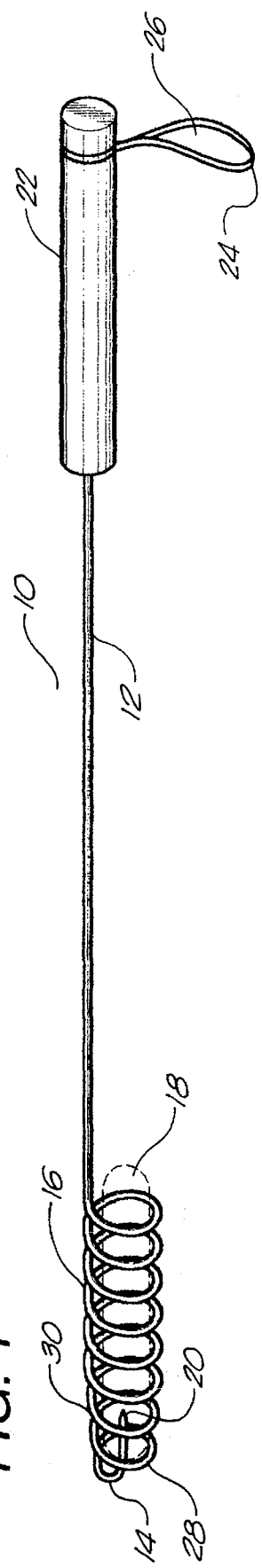
FIG. 1 is a side perspective view of the device for roasting a food item in accordance with the preferred embodiment of the present invention.

Referring to FIG. 1, there is shown at 10 the roaster device in accordance with the preferred embodiment of the present invention. The roaster device 10 includes a shaft 12, a hook member 14 formed at one end of the shaft 12, and a plurality of spirals 16 formed adjacent to the hook member 14 on the shaft 12. As can be seen, the spiral 16 has an inner diameter suitable for receiving a wiener 18 (illustrated in broken line fashion) therein. The wiener 18 is secured to the end point 20 of the hook member 14 and extends through the inner diameters of the plurality of spirals 16. It can be seen that the hook member 14 extends inwardly toward the plurality of spirals 16.

A handle 22 is affixed to an end of the shaft 12 opposite the plurality of spirals 16 and the hook member 14. The handle 22 is a wooden handle. A strap member 24 is affixed to the handle 22 and defines a loop 26 extending outwardly from the handle 22. The strap 24 allows the device 10 to be placed in a hanging position for storage.

The shaft 12, the hook member 14, and the plurality of spirals 16 are of a unitary construction. In particular, the shaft 12, the hook member 14 and the plurality of spirals 16 are formed from a stainless steel wire. Such a wire should be of sufficient diameter so as to allow the device 10 to be sufficiently rigid for the cooking of the wiener 18.

The plurality of spirals 16 include a total of eight spirals concentrically aligned along a common axis. The end point 20 of the hook member 14 is centered along this common axis. In the preferred embodiment of the present invention, a total of eight spirals are formed as the plurality of spirals 16. However, other numbers of spirals could be utilized in alternative embodiments of the present invention. Additionally, within the concept of the present invention, an additional set of spirals and hook members can be formed so as to extend from the shaft 12 in parallel relation, or otherwise, relative to spirals 16 and hook member 14. The plurality of spirals 16 should have a sufficient length so as to securely receive a food item therein. In the preferred embodiment of the present invention, this plurality of spirals will have a length less than the length of the wiener received therein. As a result, the wiener 18 will always have an end which can be easily pulled on so as to separate the wiener 18 from the interior of the plurality of spirals 16 and from the end point 20 of the hook member 14.

In the preferred embodiment of the present invention, spirals 28 and 30 at the end of the plurality of spirals 16 adjacent to the hook member 14 have a lesser diameter than the remainder of the spirals of the plurality of spirals 16. In general, these spirals 28 and 30 will have a narrowing diameter so as to taper at the hook member 14. The result of tapering these spirals 28 and 30 allows the spirals 28 and 30 to serve as a guide for the attachment of the end of the wiener 18 onto the end point 20 of the hook member 14.

As can be seen in FIG. 1, the plurality of spirals 16 will extend continuously around the outer diameter of the wiener 18. During the roasting of the wiener 18 upon a campfire, the inner surfaces of the spiral 16 will impart a "grille"-like appearance to the exterior surface of the wiener 18. As such, when the wiener 18 is removed from the interior of the plurality of spirals 16, it will have a very attractive grilled appearance. Also, since the spirals 16 extend around the entire diameter of the wiener 18, the spirals will serve to impart heat evenly over the surface of the wiener 18. As a result, the wiener 18 will be cooked in a more even and consistent fashion than with the fork-like skewers. Also, as can be seen in FIG. 1, the end point 20 of the hook member is stowed within the interior of the plurality of spirals 16. As such, it will be very difficult, if not impossible, for a person using the device 10 to injure themselves with the pointed end 20. Since the end of the wiener 18 extends outwardly of the spiral adjacent to the shaft 12, it can be easily removed with little risk of burning.

Figure 2:
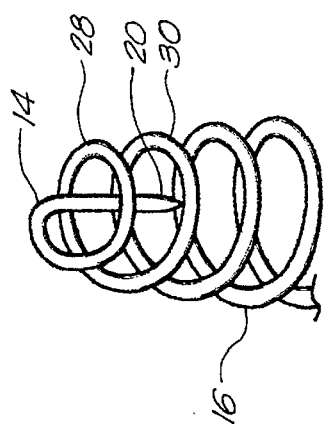
FIG. 2 is a detailed view of the spiralled end of the device.

FIG. 2 shows a detailed view of the hook member 14 and the end point 20 as positioned on the interior of the plurality of spirals 16. As can be seen in FIG. 2, the hook member 14 extends outwardly at the end of the plurality of spirals 16 and then extends inwardly into the interior Of the narrow diameter spirals 28 and 30. In the preferred embodiment of the present invention, the end point 20 will be generally aligned with the spiral 30.

Figure 3:
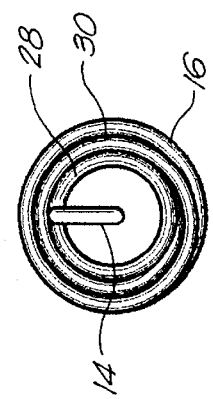
FIG. 3 is an end view of the spiralled end of the device.

FIG. 3 shows an end view of the hook member 14 and the end point 20 as positioned aligned with the common axis of the plurality of spirals 16. The centering of the end point 20 allows a wiener to be properly centered within the interior of the plurality of spirals 16. It also allows the wiener to be easily removed from the interior.

The device 10 of the present invention can be easily manufactured through a forming operation in which the stainless steel wire is wrapped around a mandrell. As a result, the device 10 can be manufactured in a much more efficient and inexpensive manner than with prior art devices.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A device for roasting a food item comprising:

a shaft;

a hook member formed at one end of said shaft; and a plurality of spirals formed adjacent to said hook member on said shaft, said hook member extending inwardly toward said plurality of spirals, said plurality of spirals having two spirals of lesser inner diameter than a remainder of said plurality of spirals, said two spirals being adjacent said hook member, said two spirals having narrowing inner diameters tapering toward said hook member, said hook member extending through said two spirals.

2. The device of claim 1, further comprising:

a handle affixed to an end of said shaft opposite said hook member.

3. The device of claim 2, said handle being a wooden handle.

4. The device of claim 2, said handle having a strap member affixed thereto, said strap member defining a loop extending outwardly of said handle.

5. The device of claim 1, said shaft, said hook member, and said plurality of spirals being of a unitary construction.

6. The device of claim 1, said plurality of spirals comprising eight spirals concentrically aligned along a common axis.

7. The device of claim 6, said hook member having an end point centered at said common axis of said eight spirals.

8. The device of claim 1, said shaft, said hook member and said plurality of spirals being formed of a stainless steel wire.

9. The device of claim 1, said plurality of spirals having a length less than a length of the food item.

10. A device for roasting a food item comprising:

a shaft;

a plurality of spirals formed at one end of said shaft, said plurality of spirals being concentrically aligned along a common axis; and a stop means connected to said plurality of spirals at an end of said plurality of spirals, said stop means for limiting movement of the food item through the plurality of spirals, said stop means comprising:

a hook member extending outwardly from said plurality of spirals, said hook member having an end point facing said plurality of spirals, said hook member extending inwardly of said plurality of spirals such that at least one spiral is positioned behind said end point.

11. The device of claim 10, said plurality of spirals comprising at least one spiral of lesser inner diameter than the remainder of said plurality of spirals, said at least one spiral being adjacent to said stop means.

12. The device of claim 10, said end point aligned with said common axis.

13. The device of claim 10, said shaft, said plurality of spirals and said stop means being of unitary construction.

14. The device of claim 13, said shaft, said plurality of spirals and said stop means being formed of a single steel wire.

15. The device of claim 10, further comprising:

a handle affixed to an end of said shaft opposite said stop means.

16. The device of claim 15, said handle having a strap member affixed thereto, said strap member defining a loop extending outwardly of said handle.

* * * * *